(12) United States Patent
Evans

(10) Patent No.: US 7,299,707 B1
(45) Date of Patent: Nov. 27, 2007

(54) ECCENTRIC VENTURI FLOW METER

(75) Inventor: Russell N. Evans, Louisville, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 11/487,759

(22) Filed: Jul. 17, 2006

(51) Int. Cl.
*G01F 1/44* (2006.01)
(52) U.S. Cl. .................................. 73/861.63
(58) Field of Classification Search .......... 73/861.63, 73/861.51, 861.52, 861.64, 861.65, 861.66

See application file for complete search history.

(56) References Cited

U.S. PATENT DOCUMENTS

| 6,463,810 B1* | 10/2002 | Liu | 73/861.63 |
| 6,612,187 B1* | 9/2003 | Lund | 73/861.04 |
| 2002/0178837 A1* | 12/2002 | Brandt | 73/861.63 |

* cited by examiner

*Primary Examiner*—Jewel Thompson
(74) *Attorney, Agent, or Firm*—Richard W. Hanes; January D. Barrett; Hanes & Schutz, LLC

(57) ABSTRACT

A venturi type of primary flow element comprising a tubular body defining a flow path having open ends and walls and including in series, a converging section, a cylindrical throat section, and a diverging section, where the bottom walls of each of said sections are in alignment and present a smooth unangled surface to flowing fluid therein.

8 Claims, 3 Drawing Sheets

FLOW

ECCENTRIC VENTURI FLOW METER

FIELD OF THE INVENTION

The present invention relates to a venturi type of primary rate of fluid flow measuring element for determining differential fluid pressure existing at spaced apart points in the flow element.

BACKGROUND OF THE INVENTION

Venturi tube flow meters are a species of differential pressure flow meters that infer a rate of a fluid flow in a closed piping system from a measurement of differential pressure that is caused by a change of kinetic energy in the fluid. The pressure drop across the flow meter is proportional to the square of the flow rate. The change of kinetic energy in a flowing fluid can be created by various types of flow measurement devices such as for example, orifice plates, pitot tubes, flow nozzles, wedge meters and venturi tubes.

Venturi tubes have the advantage of being able to handle large flow volumes while creating only low permanent pressure loss in the system. A venturi tube is essentially a section of pipe having a tapered upstream section that converges into a smaller diameter throat that is contiguous to a diverging downstream portion. All of these components are symmetrically disposed around the longitudinal axis of the conduit in which the fluid whose rate is to be measured is flowing. As fluid passes from the converging section through the throat, its velocity increases, causing a pressure differential between the venturi inlet and its throat.

Venturi flow meters, as described, are old in the art of flow measurement but with all of its advantages it, like other types of differential pressure flow meters, has disadvantages. One such disadvantage is the propensity of the changing profiles of the venturi tube to precipitate and collect sediment or solids from fluids having entrained solid materials, such as slurries and sanitary flows. Accumulation of this sediment, especially in the profile changes along the bottom interior surfaces of the venturi tube, clogs the flow meter and degrades its performance by upsetting its calibration.

Accordingly, it is the primary purpose of the present invention to provide an improved venturi flow meter that is not subject to entrapping and collecting sediment and other solid materials along and over its interior bottom surfaces, thus maintaining the calibration of the flow meter and ensuring its known accuracy, even with fluids containing suspended solids.

A further object of the invention is to provide a venturi flow meter with a smooth even bottom surface that is void of vertical profile angles and abrupt curves. Because the venturi tube requires a reduced diameter throat portion for its operation, the goal of having an unbroken regular bottom surface requires that the axis of the throat be offset from the axis of the conduit in which the fluid to be measured is flowing. Thus, the axis of the throat in the venturi tube of the present invention is eccentric to the axis of the fluid conduit.

The prior art has seen so-called eccentric venturi tubes, but the eccentric arrangement of the prior art devices does not lend itself to the purposes or objects described for the present invention. Accordingly, their structural limitations could not support their use as a flow measurement instrument. Such prior art devices may be seen in the disclosures of U.S. Pat. No. 4,325,460 for Ejector Muffler and U.S. Pat. No. 6,109,293 for Split Venturi, Axially Rotated Valve. Neither of the eccentric venturi devices included in the disclosure of these patents are concerned with fluid flow measurement, differential pressure creation or the avoidance of solid deposits.

SUMMARY OF THE INVENTION

The present invention relates to an improved venturi type of primary flow element for insertion into a fluid carrying conduit. The improved venturi tube comprises a hollow flow body having annular flanges or similar conduit attachment means at each end thereof, where the centers of each flange are coaxial with the longitudinal axis of the conduit into which the flow element is inserted and in which the fluid whose rate of flow to be measured is carried. The flow body includes at least one tapered upstream section that converges into a cylindrical throat whose longitudinal axis is vertically offset from the axis of the fluid carrying conduit. Disposed downstream of the throat is a divergent section of the flow element that expands to match the cross section of the conduit. The bottom portions of the components forming the venturi tube are all in circumferential alignment, that is, they form a smooth unbroken, unangled, laterally curved surface that will not precipitate the collection of solids that may be suspended in the fluid flowing in the conduit.

DETAILED DESCRIPTION OF PREFERRED EMBODIMENT

Figure 1:
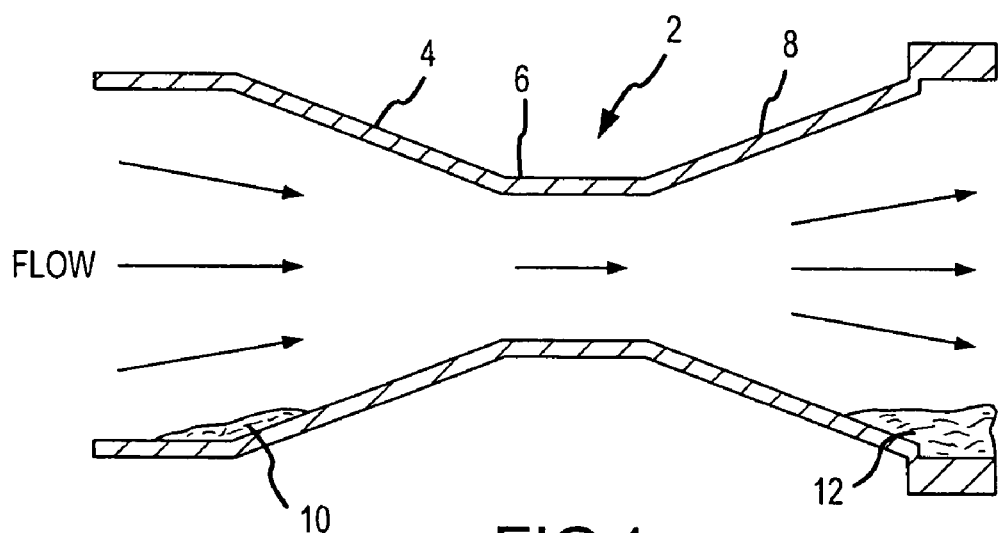
FIG. 1 is a diagrammatic cross sectional view of a traditional venturi tube showing the build up of solids precipitated out of the fluid flowing through the flow element by the changing profile of the bottom portion of the venturi tube.

Referring first to FIG. 1, a diagrammatic longitudinal cross section of a traditional prior art venturi tube is shown. The tube 2 has a tapered upstream section 4 that converges into a coaxial reduced diameter throat 6 and expands into a coaxial divergent downstream section 8. At the points 10 and 12, along the bottom surface of the tube, sediment or other foreign material has been deposited at the points of vertical change in the contour of the floor of the venturi tube is shown. Such deposits change the flow characteristics of the fluid in the tube and destroy the accuracy of the calibration of the flow meter.

Figure 4:
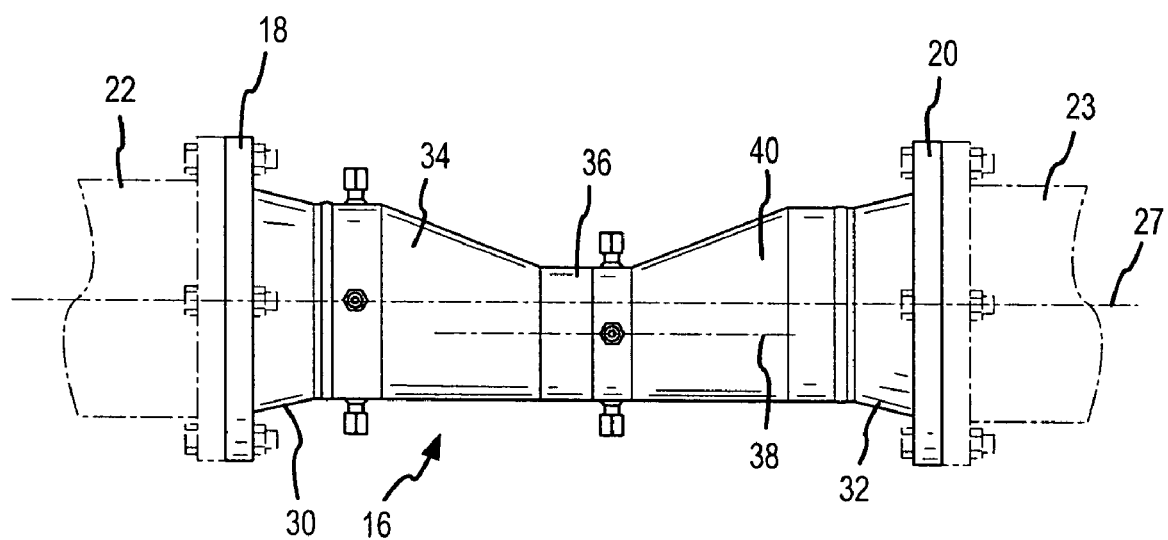
FIG. 4 is a side view of the eccentric venturi tube of the present invention with the fluid carrying conduit sections between which the eccentric venturi tube is inserted shown in broken lines.
Figure 5:
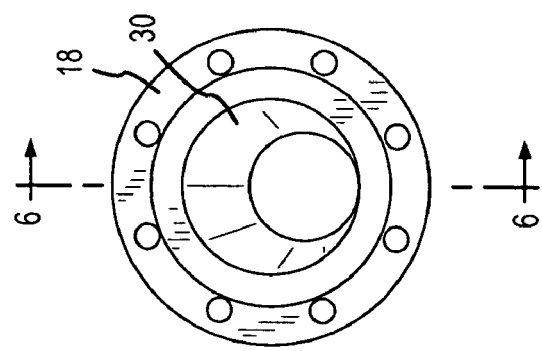
FIG. 5 is an end view of the eccentric venturi tube of the present invention.

The structural elements of the eccentric flow meter of the present invention are best seen in FIGS. 4 and 5 of the drawings. The eccentric flow meter comprises a hollow flow body 16 on each end of which are attached pipe flanges 18 and 20. While pipe flanges are shown in a preferred form of the invention, threaded pipe couplings, pipe clamps, welding or other pipe connecting means can be used without changing the scope or operation of the invention. The flanges 18 and 20 are adapted to be bolted in a traditional manner to corresponding flanges fixed to the ends of the pipe sections 22 and 23 that are to be interconnected by the eccentric venturi primary flow meter element. When connected to the pipe sections, the centers of the annular flanges 18 and 20 are coaxial with the longitudinal axis 27 of the conduits 22 and 23. For purposes of defining "upstream" and "downstream" the direction of fluid flow in the conduits is shown by arrow 28 in FIG. 6. "Upstream" is the direction from which the fluid is flowing.

Figure 2:
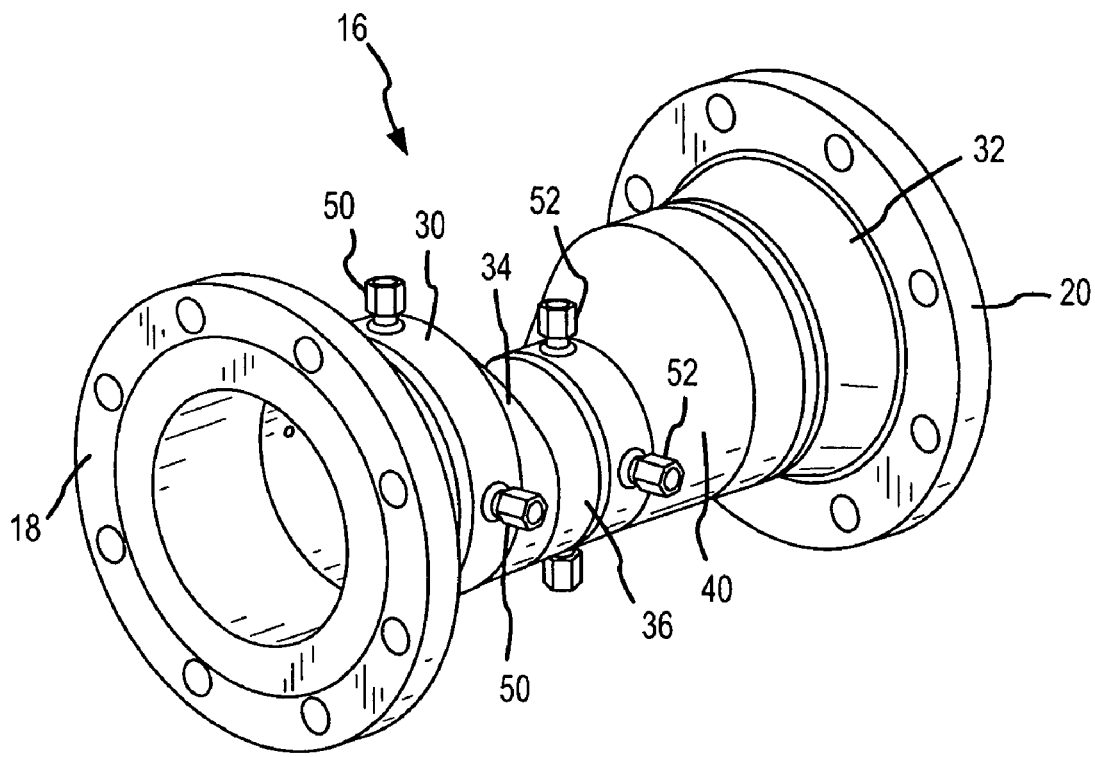
FIG. 2 is a perspective view of the eccentric venturi tube of the present invention.
Figure 3:
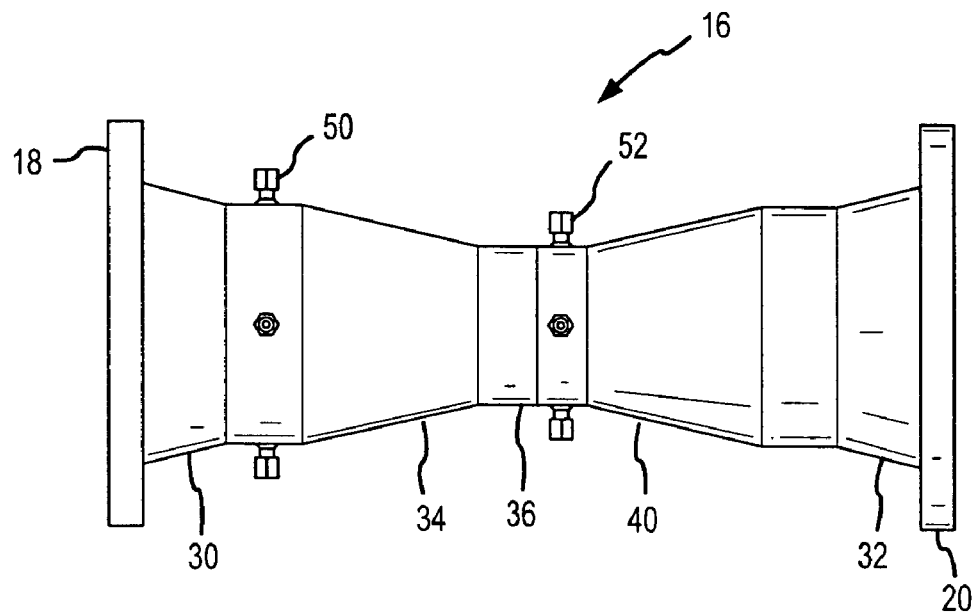
FIG. 3 is a top view of the eccentric venturi tube of the present invention.
Figure 6:
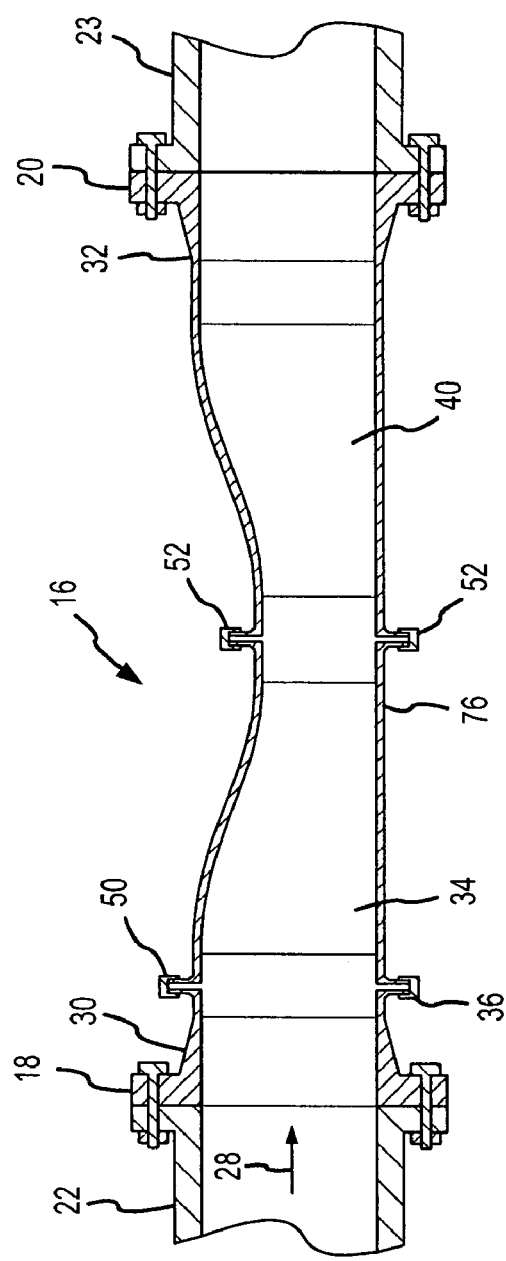
FIG. 6 is a cross sectional view of the eccentric venturi tube of the present invention taken along lines 6-6 of FIG. 5 and also including a fragmentary cross sectional view of the fluid carrying conduit sections between which the eccentric venturi tube is mounted by pipe flanges, also shown in cross section.

The flow body 16 includes upstream and downstream cylindrical end portions 30 and 32 respectively that are welded or otherwise connected to the flanges 18 and 20. Attached in fluid flow series to the cylindrical end portion 30 of the flow element is a hollow converging section 34. Each of the ends of the tapered section 34 is circular; however the downstream side of this upstream section 34 is of smaller diameter than the upstream side of the section. The bottom, or floor, of the converging section 34 is aligned with the bottom of the cylindrical end portion 30, as seen in FIGS. 2, 4 and 6. Adjacent the small diameter end of the converging section 34 is a cylindrical throat 36. The longitudinal axis 38 of the throat is seen in FIG. 4 to be vertically offset toward the bottom of the flow tube from the axis 27 of the fluid carrying conduits 22 and 23 in order that the bottom of the throat will be aligned with the bottom of the cylindrical end portion 30 and the bottom of the converging section 34. Such alignment presents a smooth unangled and uninterrupted surface over which the fluid may flow.

Attached to the downstream end of the throat 36 is a divergent or expanding section 40 of the flow element. Although shown in the drawings as being identical in shape and angular slope to the converging section 34, the diverging section can have other characteristics as long as the bottom of this section 40 is also in alignment with the bottoms of the preceding sections, as shown in FIGS. 4 and 6. This alignment maintains a smooth laterally circular surface that is without irregularities, angles, changes in vertical profile or flow disturbing influences that would result in the deposit of suspended solids on the floor of the flow element 16. The downstream cylindrical end portion 32 is attached to the downstream end of the divergent section 40. As with the upstream end section 30, the bottom of the downstream end section 32 is aligned with the bottom portions of the other sections of the tubular flow element 16.

The differential pressure of the fluid flowing through the eccentric venturi tube 16 is sensed in a traditional manner by high pressure ports 50 disposed in the upstream cylindrical end portion 30 and by low pressure throat ports 52 disposed in the walls of the throat 38. Multiple high and low pressure ports are preferable in order that different pressures existing around the circumference of the tube at the points of sensing may be averaged.

By altering the traditional venturi flow element to move the throat vertically off center the non-clogging objective of the invention is realized. The eccentric change in configuration of the throat with respect to the other elements of the venturi tube has no adverse affect on the low non-recoverable pressure drop that is a significant advantage of venturi tube flow meters.

What is claimed is:

1. A venturi type of primary flow element comprising,
   a tubular body defining a flow path having open ends and walls and including in series,
   a converging section,
   a cylindrical throat section, and
   a diverging section,
   where the bottom walls of all of said sections are in alignment.

2. The flow element of claim 1 and further including,
   at least one pressure sensing port disposed in a wall of the cylindrical throat section, and
   at least one pressure sensing port disposed in a wall of the tubular body upstream of the converging section.

3. The flow element of claim 1 and further including,
   pipe connecting flanges attached to the ends of the tubular body.

4. A venturi primary flow meter element for insertion into a fluid carrying conduit, comprising,
   a tubular flow body having bottom, top and side walls and annular flanges at each end of the body, where the centers of each flange are coaxial with the longitudinal axis of the conduit, said body including,
   a centrally disposed cylindrical throat whose longitudinal axis is vertically offset from the longitudinal axis of the conduit.

5. The primary flow element of claim 4 where the tubular flow body includes, on either side of the cylindrical throat, a convergent section and a divergent section.

6. The primary flow element of claim 5 where the tubular flow body includes a cylindrical section upstream of the convergent section.

7. The primary flow element of claim 6 and further including,
   at least one pressure sensing port disposed in a wall of the cylindrical throat, and
   at least one pressure sensing port disposed in a wall of the cylindrical section upstream of the converging section.

8. The primary flow element of claim 7 where the bottom walls of the cylindrical throat, the convergent section, the divergent section and the cylindrical section upstream of the converging section are in alignment.

* * * * *